United States Patent [19]

Grapenthin et al.

[11] Patent Number: 5,208,518

[45] Date of Patent: May 4, 1993

[54] DC-DC BOOST CONVERTER FOR SPINDLE MOTOR CONTROL

[75] Inventors: Hans Grapenthin, Westendorf; Horst Haug, Stoettwang, both of Fed. Rep. of Germany

[73] Assignee: Digital Equipment Corporation, Maynard, Mass.

[21] Appl. No.: 792,848

[22] Filed: Nov. 15, 1991

[51] Int. Cl.$^5$ .............................................. H02P 7/00
[52] U.S. Cl. .................................... 318/138; 318/254; 318/439
[58] Field of Search ............... 318/500, 105–109, 318/504, 506, 138, 254, 439, 795, 800, 803, 805, 806, 811, 812, 440, 442, 272, 275, 273, 362, 368, 778, 757; 388/811, 815

[56] References Cited

U.S. PATENT DOCUMENTS

| | | | |
|---|---|---|---|
| 4,047,081 | 9/1977 | Liska . | |
| 4,538,100 | 8/1985 | Taten et al. | 318/808 |
| 4,600,864 | 7/1986 | Sato . | |
| 4,761,599 | 8/1988 | Yasunobu et al. . | |
| 4,763,052 | 8/1988 | Lundin et al. . | |
| 4,814,675 | 3/1989 | Perilhon | 318/254 |
| 4,870,332 | 9/1989 | Coghran et al. | 318/254 |
| 4,959,602 | 9/1990 | Scott et al. | 318/803 |
| 4,967,132 | 10/1990 | Rozman et al. | 318/806 X |

FOREIGN PATENT DOCUMENTS 2834523 5/1986 Fed. Rep. of Germany .
3418191 10/1989 Fed. Rep. of Germany .

OTHER PUBLICATIONS

Manias and Ziogas, "An SMR Topology with Suppressed DC Link Components and Predictive Line Current Waveshaping," IEEE Transactions on Industry Applications, vol. IA-23, No. 4, Jul./Aug. 1987, pp. 644–653.

Namuduri and Sen, "A Servo-Control System Using a Self-Controlled Synchronous Motor with Sliding Mode Controller," IEEE Transactions on Industry Applications, vol. IA-23, No. 2, Mar./Apr. 1987, pp. 283–295.

*Primary Examiner*—Jonathan Wysocki
*Attorney, Agent, or Firm*—Ronald E. Myrick; Barry N. Young; Ronald C. Hudgens

[57] ABSTRACT

A process and a circuit control the rotational speed of a direct current motor. In particular, the motor may be used to drive magnetic or optical data carriers. The motor is fed with a motor current by a switching device for commutation wherein the motor current induces a magnetic flux which generates the motor torque. The process and circuit increase the motor voltage applied to the motor in the startup or braking phase to a value above the supply voltage. Further, the process and circuit reduce the motor voltage during the commutation phase so that commutation switching may occur in a reduced-current condition.

7 Claims, 4 Drawing Sheets

DC-DC BOOST CONVERTER FOR SPINDLE MOTOR CONTROL

FIELD OF THE INVENTION

The present invention relates to a process and a circuit for control of the rotational speed of a direct current motor, particularly for use as the drive of magnetic or optical data carriers, wherein the motor has a rotor with a plurality of permanent magnet poles and a stator with a plurality of windings which are fed with a motor current by means of a switching unit for commutation, wherein, by means of the motor current, a magnetic flux is induced generating the torque of the rotor.

BACKGROUND OF THE INVENTION

Modern drives of magnetic or optical data carriers customarily use brushless direct current motors to drive the spindle carrying the data carrier, or to drive the transport unit for the magnetic tape or other data carrier.

An example of such a data carrier system is a disk drive, which uses floating read/write heads that start off and land on the disk surface. This means that the read/write heads and the disks go through critical phases of friction during which there is a high risk of damage or destruction of the data carrier. There is also a risk of damage to the read/write heads. It is accordingly desirable that the start off and landing phases be as short as possible. However, this requires that the motor have a high starting torque and stopping, or breaking, torque.

The motor size and the rotational speed, however, can not be raised arbitrarily. For a brushless direct current motor generally, $$K_m = K_v^2 / R \qquad (1)$$

where $K_m$ is the motor constant, which is give by the motor construction, the available motor space, and the magnetic material. $K_v$ is the back EMF constant, also known as the counter voltage constant, and R is the ohmic motor resistance.

The equivalent circuit diagram of a motor consists of a resistance, an inductance, and a generator which generates the counter voltage in dependence on the rotational speed. The supply voltage is divided across voltage drops at the switching transistors, the leads, and across the internal motor resistance, as well as across the counter voltage. $K_v$ is simultaneously, in the metric system while leaving out bearing friction, the torque constant $K_t$, which gives the torque per ampere generated by the motor. The possible counter voltage divided by the rotational speed is accordingly proportional to the turning moment T.

$$T = K_v / \omega \qquad (2)$$

or $$T = K_v \cdot I_m \qquad (3)$$

with $I_m$ as the motor current.

If the ohmic resistance R is raised, i.e. more windings are wound on to the stator, then the induced voltage rises, as does the back EMF constant $K_v$. The applied motor voltage divided by the motor resistance gives the theoretical maximum possible starting current $I_m$.

The supply voltage and the desired rotational speed give the maximum possible value for the rotational moment T, and thereby the maximum possible motor starting torque $T_s$. However, the torque T must be chosen so that the counter voltage at a given rotational speed still lies below the supply voltage. Therefore, since the ohmic motor resistance is fixed, a motor design must compromise between a high motor starting torque $T_s$ and a large counter voltage.

In the known brushless direct current motors, a fixed supply voltage is used and the motor current is adjusted by means of a speed control loop responsive to the operating conditions of the motor. The motor current control is effected by pulse width modulation and/or series control. With pulse width modulation, the full supply voltage is applied in a pulsed fashion to the motor. With series control, the power supplied to the motor can be controlled by converting some power into lost heat by using a voltage drop across a series resistance.

In the startup phase of the motor, there is no counter voltage present since the rotational speed is zero. For this reason, the starting current must be limited, whereby the starting torque is reduced to relatively low values.

The motor coils, normally numbering three to six, are customarily connected in fixed fashion with the current control circuit and are connected together in a triangular or star shape. The star arrangement is used for unipolar controls, in which all currents flow to a common earth. The triangular arrangement is used for bipolar controls, in which the current in each coil flows in both directions. A star arrangement may also be used for bipolar control if each branch of the star contains two coils in series.

In known current control circuits, there is the possibility of achieving a high starting torque at a predetermined rotational speed and supply voltage by switching over from bipolar to unipolar drive. During startup, the motor is run in bipolar drive, with two coils switched in series in order to achieve a high starting torque. After achieving a given speed, the motor is switched over to unipolar drive. This then has a lower counter voltage at a given rotational speed as a result.

For the supply of energy to disk drives, a supply voltage of 12 volts is normally fixed by industry standard. This substantially limits the power which can be delivered by the direct current motor. If, for example, the motor resistance is 1 ohm and the motor current can be at most 4 amperes, then the maximum power which can be delivered by the motor is given by $$P = V \cdot I = I^2 / R = 16 watts \qquad (4)$$

To achieve the maximum possible starting torque, the motor current must therefore be raised. However, increasing the motor current requires a more powerful voltage supply and a motor circuit capable of carrying the additional current. This would result in additional costs.

A motor bridge, consisting of a series of switches, preferably bridge transistors, is normally used for commutation of the motor. The operation of these switches is matched to the commutation phases of the motor. If the inductance of the coil of the stator is subjected to a pulsed voltage, then excess current oscillations arise when the voltage is switched on, and strong excess voltage spikes arise when the voltage is switched off. These oscillations and spikes are minimized in customary circuits by a delayed voltage rise or fall, i.e. by so-called soft switching. The disadvantage of soft switching is an increased power loss in the bridge transistors. If the transistors are hard switched, then so-called snubber networks, preferably RC members, are normally used, which convert the voltage spikes into waste power. However, the remaining current overshoot, caused when switching on an inductance, is one of the sources of motor noise.

SUMMARY OF THE INVENTION

In contrast to the foregoing, the object of the invention consists of improving the process and circuit for controlling the rotational speed of a direct current motor so that the control is optimized during a particular operating phase of the motor.

The invention improves the control of the rotational speed of the motor by increasing or decreasing the voltage applied to the motor during a particular operating phase of the motor.

Preferably, the startup and braking phases should be optimized. This is accomplished by boosting the motor voltage during these phases to a value above the supply voltage. Boosting the motor voltage allows the motor resistance to be increased. For example, additional windings may be applied to increase the starting torque.

Additionally, the commutation phase should be optimized to allow the motor bridge to switch in a current free condition. This makes possible the use of cheaper motor bridges. Optimization of the commutation phase is effected by lowering the motor voltage during the commutation phase.

Further advantageous features of the process in accordance with the invention, or of the circuit in accordance with the invention, will be illustrated.

The invention is characterized in particular in that a high starting torque can be achieved. Thereby the read/write heads of a disk drive can lift faster. The danger of damage from particle formation and of erasure is diminished, and the lifetime of the components is raised by a multiple.

The invention can raise the overall efficiency of the speed control. There are no additional circuit elements necessary beyond those required by the state of the art. In addition, no power losses arise, in contrast to the case of series control. It is possible to carry out the speed control in the motor with or without sensors, and the components of the circuit in accordance with the invention are so conceived that they can all be installed on a single chip with a high degree of integration.

BRIEF DESCRIPTION OF THE DRAWINGS

The embodiment of the invention is described in more detail with reference to the drawings. In the drawings.

DETAILED DESCRIPTION

Figure 1:
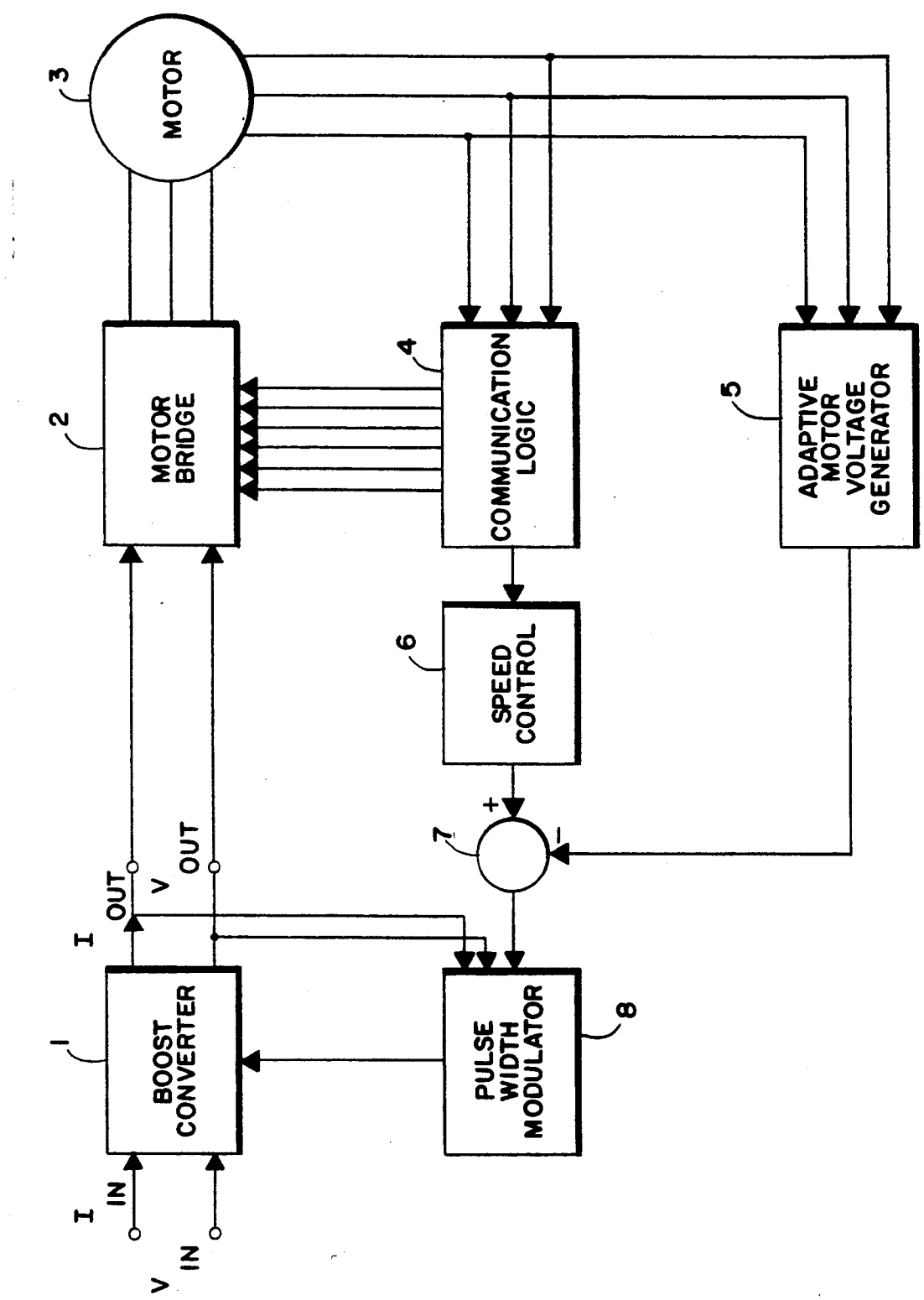
FIG. 1 is a block diagram of a circuit for the control of the speed of a direct current motor in accordance with the invention.

The block diagram of FIG. 1 depicts a direct current boost converter 1, which represents a current converter for direct current. A supply voltage $V_{in}$, which provides an input current $I_{in}$, is applied to the input of the boost converter 1. At the output of the boost converter 1, an output current $I_{out}$ is provided, as is an output voltage $V_{out}$, which is fed to a motor bridge 2. The motor bridge 2 is used, as is set out below, for commutation of the motor current fed to a motor 3.

The motor 3 can serve as the drive for the spindle of an optical or magnetic data carrier, such as a fixed disk, a magnetic tape, or the like. The motor 3 can also serve as the drive for the mirror of a laser printer.

From the motor 3, position signals are derived in customary fashion which are fed to the commutation logic 4 and to an adaptive motor voltage generator 5.

The motor bridge 2 is responsive to the output of the commutation logic 4, which operates in known fashion in response to the position signals received from the motor 3. Additionally, the commutation logic 4 gives a synchronized signal which is dependent on the motor 3 speed, to a speed control 6.

The output of the speed control 6 is connected to the positive input of a subtraction circuit 7. The output of the adaptive motor voltage generator 5 is connected to the negative input of the subtraction circuit 7. The subtraction circuit 7 subtracts the output signal of the adaptive motor voltage generator 5 from the output signal of the speed control 6. The output of the subtraction circuit 7 is fed to a pulse width modulator 8 which controls the boost converter 1.

The pulse width modulator 8 is also fed the output voltage $V_{out}$ of the boost converter 1. This allows the pulse width modulator 8 to detect, and thereby limit, overvoltage conditions.

The boost converter 1 will now be described in more detail with reference to FIG. 2. The fixed control voltage $V_{in}$, which may be equal to 12 volts according to the industry standard, is applied to two of the inputs of boost converter 1.

The boost converter 1 includes, in particular, a choke coil 11, a diode 12, a switching element 13, and a capacitor 14. The choke coil 11 and diode 12 are connected in series. In FIG. 2, the switching element 13 is embodied as a transistor with a primary conductive path responsive to a pulse width modulator 8'. The primary conductive path begins at the junction of the choke coil 11 and the diode 12, and ends at earth. The capacitor 14 is arranged in parallel with the primary conductive path of the switching element 13.

Figure 2:
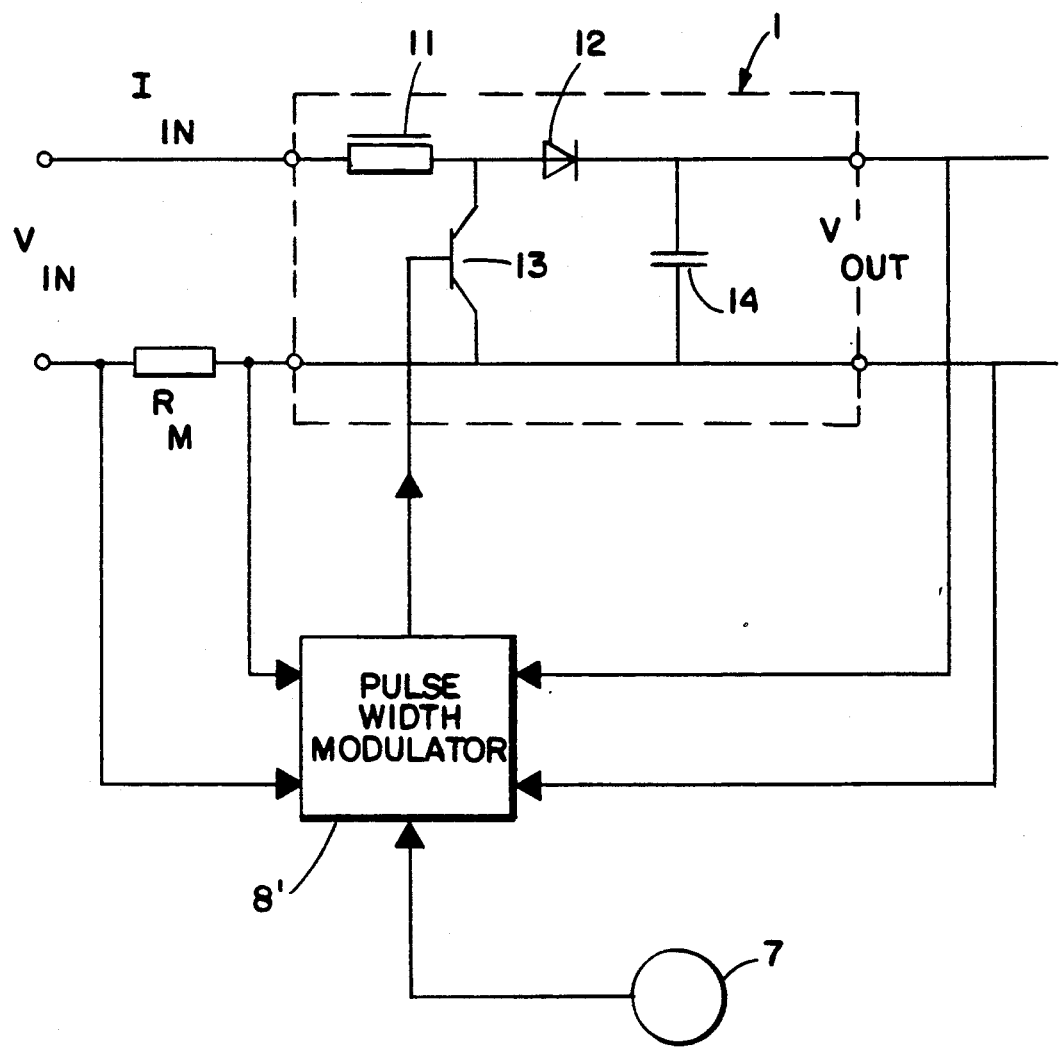
FIG. 2 is a schematic diagram of a boost converter in accordance with the invention.

As is also shown in FIG. 2, a pulse width modulator 8' may be used which is further responsive to the input current, as measured through the measuring resistance $R_M$, of the boost converter 1. The pulse width modulator 8' responds to the input current of the boost converter 1 by means of the voltage drop across the measuring resistance $R_M$.

Boost converter 1 works as follows. As long as the switching element 13 is open, the input voltage $V_{in}$ is transferred to the output terminals. If the switching element 13 turns on, the choke coil 11 charges. When the switching element 13 is subsequently turned off, the choke energy is transferred to the capacitor 14. This additional energy stored in the capacitor 14 raises the output voltage $V_{out}$ to a value exceeding $V_{in}$.

The ratio $V_{out}/V_{in}$ depends on the duty cycle of the switching element 13, i.e. the ratio between the time during which it is switched on, and the total time.

The boost converter 1 can convert an input voltage $V_{in}$ of, for example, 12 volts, to an output voltage $V_{out}$ of, for example, 12 to 30 volts. Preferably the output voltage $V_{out}$ is limited to 24 volts, which corresponds to a duty cycle of 50%. The output voltage $V_{out}$ is then fed to the pulse width modulator 8', which, in turn, controls the switching element 13.

The boost converter 1 works with a synchronous frequency of, for example 100 kHz, and provides at its output direct current voltage pulses, the width of which is controlled by the pulse width modulator 8'.

In place of the boost converter 1, a synchronous voltage converter device can be used. In this case, a control circuit located in the synchronous voltage converter device changes the pulse width of the voltage pulses.

The boost converter 1 replaces the customary current control circuit and serves as a driver in a control loop. The boost converter 1 may be so arranged that it can raise the output voltage from an input voltage of 12 volts, to an output voltage of 30 volts. It is preferred that the output voltage be raised to 24 volts, so that normal electrolytic capacitors rated up to 24 volts can be used.

In contrast to the normal current control circuit, the use of the boost converter 1 has the advantage of smaller power losses. Likewise, the component costs and space requirements are substantially diminished in contrast to bipolar-unipolar coil changeover, which requires an additional switch.

The output voltage $V_{out}$ of the boost converter 1 is fed to the motor bridge 2, which, in known fashion, consists of bipolar or FET transistors and controls the windings of the stator so that the commutation of the rotor current is undertaken electrically.

The motor 3 may be a motor with or without brushes, but a brushless motor is preferred. The direct current motor 3 has preferably four or eight magnetic poles. The motor 3 is controlled in known fashion via three coil connections, wherein the coils can be switched as a triangle or star. The generation of position signals from the motor 3 can be done in known fashion by Hall sensors, or by other sensors which generate position signals dependent upon the magnetic field in the motor 3. The position signals can also be generated without sensors, for example by measuring the back EMF.

The position signals derived from the motor 3 are fed in known fashion to the commutation logic 4, which processes the position signals by logical calculation. The commutation logic 4 feeds the motor bridge 2 in such a fashion that the electronic commutation takes place correctly, dependent upon the position signals.

An alternative embodiment, that does not include the subtraction circuit 7 or the adaptive motor voltage generator 5, may also be used. In this embodiment, the commutation logic 4 provides in known fashion a synchronized signal to the speed control 6, which is dependent on motor speed. The speed control 6 compares this signal with a desired value and produces an analog signal representing the difference, which is then provided directly to the pulse width modulator 8', by means of which the pulse width is controlled.

Figure 3A:
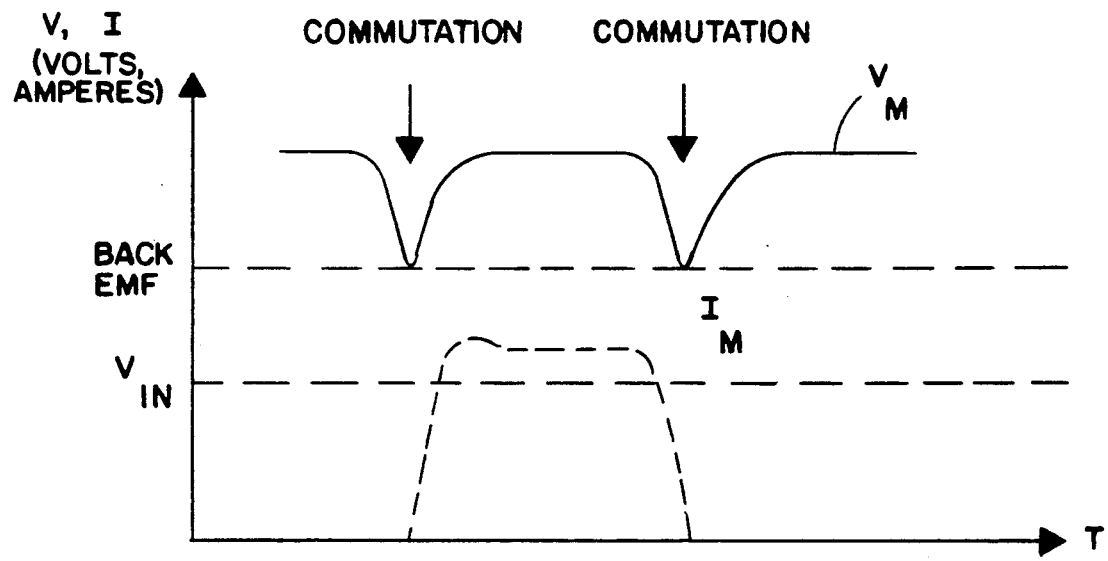
FIG. 3a is a graphical diagram to explain the course of the motor voltage and the motor current in the circuit in accordance with the invention.

In the following, with reference to FIG. 3, the adaptive motor voltage generator 5 is described in more detail. This functional block, which is responsive to the motor position signals, generates a signal that is later subtracted from the output of the speed control 6 by the subtraction circuit 7. The adaptive motor voltage generator 5 captures position signals, from Hall sensors or, alternatively, from the commutation logic 4, and calculates therefrom where the next commutation should take place. This can be effected, for example, by means of a counter or a shift register, in which the running values are stored. When the predetermined value is achieved, which indicates the position at which commutation should take place, the adaptive motor voltage generator 5 provides an output signal to the negative input of the subtraction circuit 7. As a result, the output voltage $V_{out}$ of the boost converter 1 is reduced. This subsequently affects the motor voltage $V_m$, as illustrated in FIG. 3a. Preferably, this reduction occurs shortly before, during and after the commutation phase. It is also preferred that $V_m$ be reduced to a level below the back EMF of the motor 3, so that the motor current $I_m$, also illustrated in FIG. 3a, becomes equal to zero. This has the advantage that the motor bridge 2 switches in a current free condition, allowing cheaper motor bridges to be used.

During the commutation phase, the control signal of the speed control 6, which adjusts the pulse width of the boost converter 1, is correspondingly reduced by the output signal of the adaptive motor voltage generator 5. This has, however, very little influence on the speed control 6 since the motor moment of inertia is very high.

In what follows, the procedure for switching in the motor 3 after the commutation phase is described. Since the motor voltage $V_m$ during the commutation phase is reduced below the level of the back EMF, the switching occurs during a current free condition. After the commutation, the motor voltage $V_m$ is slowly raised and the motor current $I_m$ likewise increases, as is evident from FIG. 3a.

Since the rise in voltage can be adjusted without loss, by a strong flattening of the rise before the voltage maximum, an overshoot of the motor current $I_m$ is prevented. Thereby the motor noise can be reduced by about 10% with respect to the state of the art.

In corresponding fashion, during the switching off process before the next commutation phase, the motor voltage is again reduced below the level of the back EMF, so that the motor bridge 2 switches the respective coils free of current. Thereby a voltage rise is avoided which would be generated by the switching of the inductances of the coil in the presence of current.

Figure 3B:
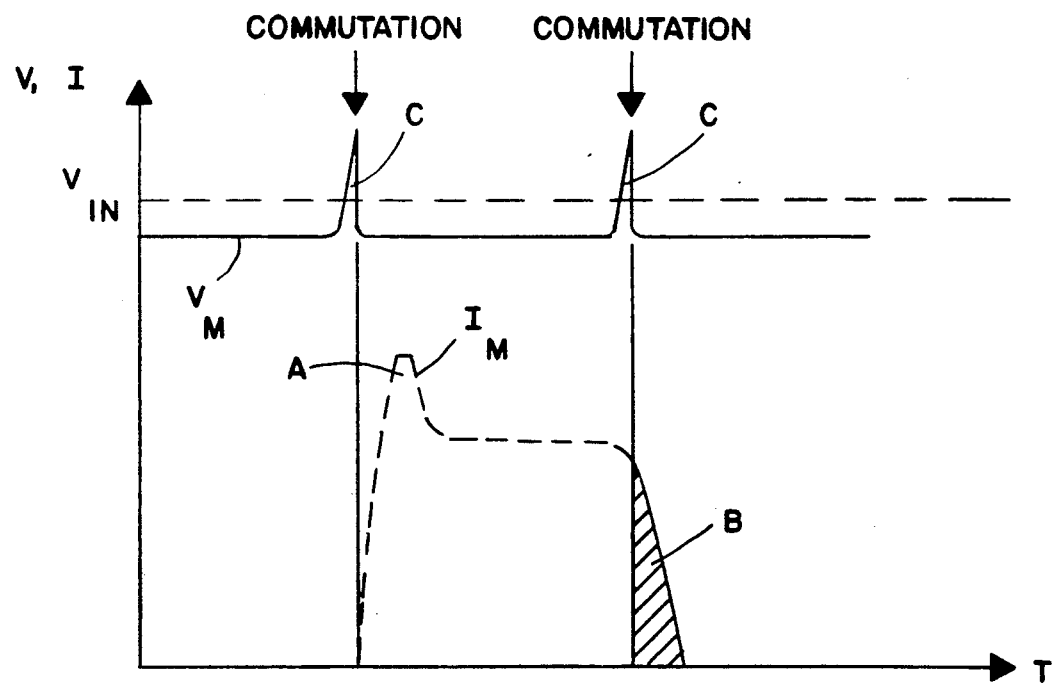
FIG. 3b is a graphical diagram for explaining the course of the motor current in the state of the art.

For a comparison, FIG. 3b is a graphical illustration helping to explain the course of the motor current in the case of the state of the art. As described above, current swings arise in the known circuits when motor bridge switches turn on, as shown by region A of the motor current $I_m$, illustrated in FIG. 3b. When switching off, the motor inductance attempts to maintain the current flow, as shown by region B. The rapid switching off of the motor inductance causes an excess voltage peak, which is shown by segment C of the motor voltage $V_m$. While a portion of the excess voltage peak is converted by RC members into lost heat, the remaining portion is applied to the motor bridge and is one of the causes of motor noise. In FIG. 3b, the motor voltage $V_m$ is switched from one coil to another coil during commutation.

Figure 4:
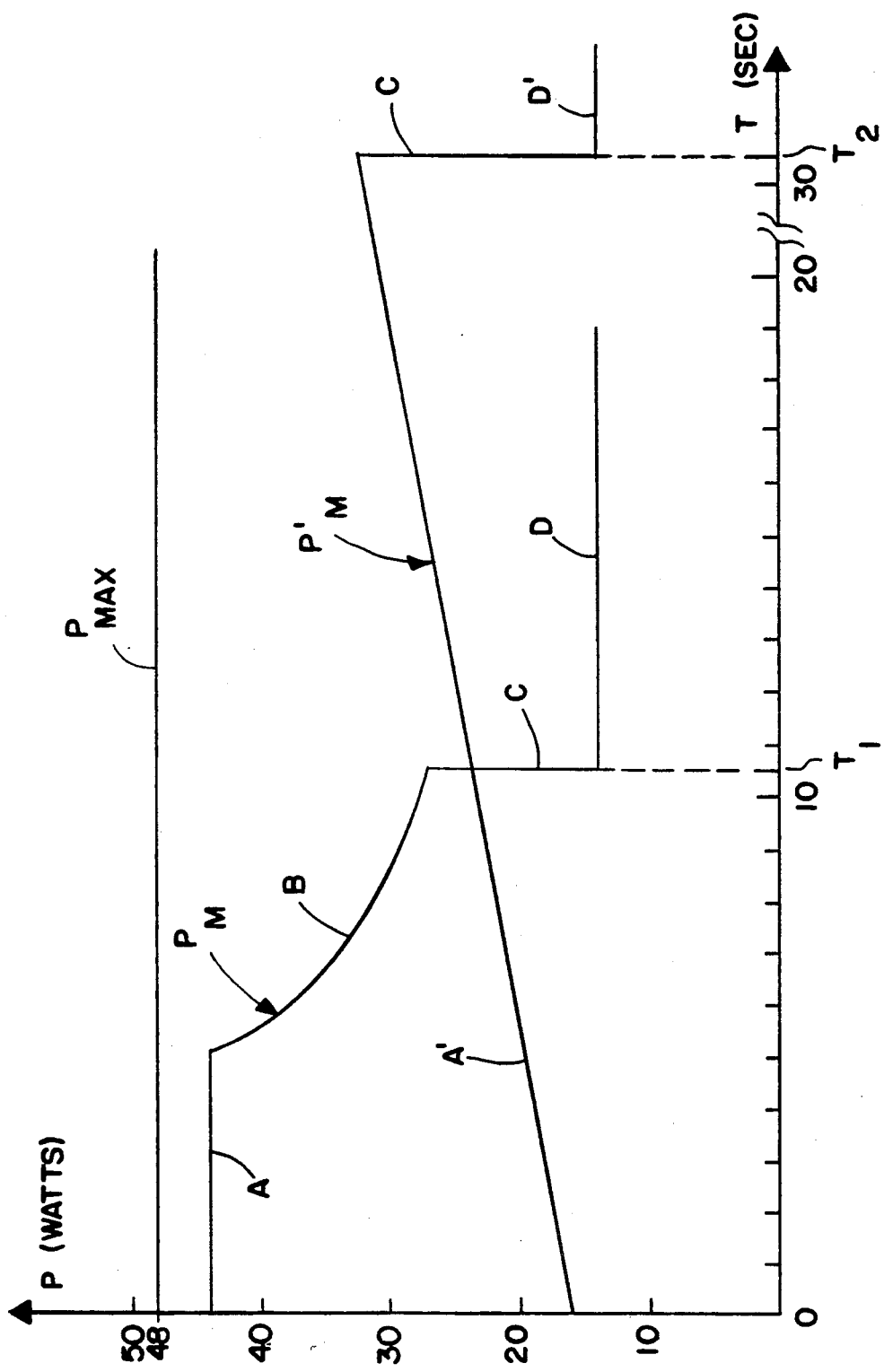
FIG. 4 is a graphical diagram comparing the motor operation in accordance with the invention, during the motor startup phase, with the operation of the state of the art.

In what follows, with reference to FIG. 4, the operation of the motor 3 during the startup phase is described in more detail. As was described above, the circuit in accordance with the invention can raise the motor voltage to a multiple of the supply voltage. The torque constant $K_t$, which is the same as the back EMF constant $K_v$ in the absence of bearing friction, can therefore also be raised. The torque constant can be raised since the supply voltage, which can be boosted, no longer represents a limitation on the back EMF, as is the case in the state of the art.

Given that the motor resistance equation $$R_m = V_{DC}/I_{max} \quad (5)$$

is valid, if the full power is applied to the motor during startup with $V_{DC}$ equal to 12 volts and $I_{max}=4$ amperes, then the motor resistance $R_m$ is 3 ohms. The motor can accordingly be provided with a higher number of windings.

From equations (1) and (2), it is evident that the starting turning moment is $\sqrt{3} \approx 1.7$ times higher than in the case of the state of the art in which the motor resistance is 1 ohm, since the motor constant $K_m$ is the same.

In FIG. 4 the motor energy in watts corresponds to the ordinate and the time to the abscissa. A plot of the motor energy in accordance with the invention is denoted by $P_m$, and a plot of the motor energy in the case of the sate of the art is denoted by $P'_m$. In accordance with the invention, no current limitation is necessary during motor 3 startup since, on switching on the motor resistance, the motor current is limited. Up to this point in time, the boost converter 1 does not cycle. The current is slightly above the actuation limit of the pulse width modulator 8, so that the current limitation locks the output pulses to the boost converter 1. The motor 3 begins to turn and a back EMF arises.

Now the boost converter begins to work and to increase the motor voltage in such a way that the maximum power available from the supply unit, $P_{max}$, is not exceeded. In FIG. 4, $P_{max}$ equals 48 watts, which is the product of the 12 volt supply voltage and the 4 ampere maximum current, as noted in the example above. During the startup phase, denoted by segment A of plot $P_m$, the supply unit power, minus the loss of power from the boost converter 1 and the motor bridge 2, is available for acceleration. This increased power provided by the boost converter 1 allows the startup to take place in about one third of the time required by the known circuit.

During this startup phase, the current limitation of pulse width control is active, which results from the fact that the current flowing through the measuring resistance $R_M$ is measured by the pulse width modulator 8'. If a current flow that exceeds a predetermined value, e.g. 4 amperes, is detected, the pulse width modulator 8' emits a corresponding signal to the switching element 13.

If the motor voltage achieves the preferred maximum value of 24 volts, the excess voltage limitation becomes active and limits the motor voltage. The output voltage $V_{out}$ of the boost converter 1 is monitored by the pulse width modulator 8'. If $V_{out}$ exceeds a preset limit, such as 24 volts, the pulse width modulator 8' emits a signal to the switching element 13. This voltage limitation is necessary to protect the components. Thus, at a voltage limitation of 24 volts, for example, simple electrolytic capacitors can be used. Segment B of the $P_m$ plot in FIG. 4 represents the effect of the voltage limitation.

Once the desired motor speed is achieved, the motor energy transitions through segment C of plot $P_m$. The speed control then operates in known fashion, shown in segment D of plot $P_m$, wherein the output voltage $V_{out}$ varies slightly above the back EMF in order to compensate for friction losses and to stabilize the motor speed.

The plot $P'_m$ in FIG. 4 represents the motor energy of the state of the art during motor startup. The initial current is, in this case, limited to 4 amperes and the counter voltage rises linearly so that the motor energy in segment A' of plot $P'_m$ rises linearly. On achieving the desired speed of the motor, the motor energy falls through segment C' of plot $P'_m$ and, in known fashion, the speed control begins operation, as shown in segment D' of plot $P'_m$.

Changes in the embodiment described are obviously possible for one skilled in the art and fall within the scope of the invention.

What we claim is:

1. A circuit for controlling the rotational speed of a direct current motor comprising:
    means for producing a supply voltage;
    means for modifying the supply voltage;
    a motor bridge coupled to the means for modifying the supply voltage and being effective to provide a motor voltage to the motor;
    a commutation circuit responsive to motor position that is effective to control the motor voltage provided by the motor bridge, the motor voltage being a commutated form of the modified supply voltage;
    means for controlling the modified supply voltage, the means for controlling the modified supply voltage producing a control signal effective to control the means for modifying the supply voltage, the means for controlling the modified supply voltage being effective to raise the modified supply voltage to a voltage above the supply voltage during the startup phase and during the braking phase and being effective to lower the modified supply voltage to a voltage below the supply voltage in the region of each commutation phase.

2. The circuit of claim 1 wherein the means for controlling the modified supply voltage comprises:
    a speed control circuit for producing a speed signal responsive to the speed of the motor;
    an adaptive motor voltage generator producing a subtraction signal responsive to the position of the motor, the subtraction signal being at a maximum when the motor is in the region of each commutation phase;
    a subtraction circuit having a positive input responsive to the speed signal, a negative input responsive to the subtraction signal, and a difference output, the difference output being in proportional relation to the speed signal minus the subtraction signal; and
    a pulse width modulator for producing the control signal responsive to the difference output of the subtraction circuit, the control signal being effective to raise the modified supply voltage to a voltage above the supply voltage at the starting and at the braking phases in response to the speed signal, and being effective to lower the modified supply voltage to a voltage lower than the supply voltage in the region of each commutation phase in response to the subtraction signal.

3. The circuit of claim 2 wherein the means for controlling the modified supply voltage is further effective to allow the motor bridge to switch the motor voltage during a substantially current-free condition to accomplish commutation of the motor.

4. A process for controlling the rotational speed of a direct current motor, which comprises:
producing a motor voltage from a supply voltage;
supplying the motor voltage to the motor;
raising the motor voltage to a voltage above the supply voltage during the startup phase of the motor;
raising the motor voltage to a voltage above the supply voltage during the braking phase of the motor;
reducing the motor voltage in the region of each commutation phase, including commutation phase regions which coincide with a startup or a braking phase.

5. The process of claim 4 further comprising switching the motor voltage during a substantially current-free condition to accomplish commutation of the motor.

6. The process of claim 5 wherein reducing the motor voltage in the region of each commutation phase comprises reducing the motor voltage to substantially zero.

7. The process of claim 4 wherein raising the motor voltage at the startup phase and raising the motor voltage at the braking phase comprise raising the motor voltage to a voltage which is two to three times as high as the supply voltage.

* * * * *